(No Model.) 3 Sheets—Sheet 1.

C. ADAMS.
PROCESS OF REDUCING IRON ORE.

No. 431,864. Patented July 8, 1890.

WITNESSES
W. Bakewell
Thomas W. Bakewell

INVENTOR
Charles Adams (No Model.) 3 Sheets—Sheet 2.

C. ADAMS.
PROCESS OF REDUCING IRON ORE.

No. 431,864. Patented July 8, 1890.

(No Model.) 3 Sheets—Sheet 3.

C. ADAMS.
PROCESS OF REDUCING IRON ORE.

No. 431,864. Patented July 8, 1890.

WITNESSES. INVENTOR.

UNITED STATES PATENT OFFICE.

CHARLES ADAMS, OF PITTSBURG, PENNSYLVANIA, ASSIGNOR OF ONE-HALF TO RALPH W. CARROLL AND FERDINAND PROTZMAN, SR., BOTH OF SAME PLACE.

PROCESS OF REDUCING IRON ORE.

SPECIFICATION forming part of Letters Patent No. 431,864, dated July 8, 1890.

Application filed January 11, 1890. Serial No. 336,607. (No model.)

*To all whom it may concern:*

Be it known that I, CHARLES ADAMS, of Pittsburg, in the county of Allegheny and State of Pennsylvania, have invented a new and useful Improvement in the Process of Manufacturing Iron Direct from the Ore, of which the following is a full, clear, and exact description, reference being had to the accompanying drawings, forming part of this specification, in which—

Figure 1:
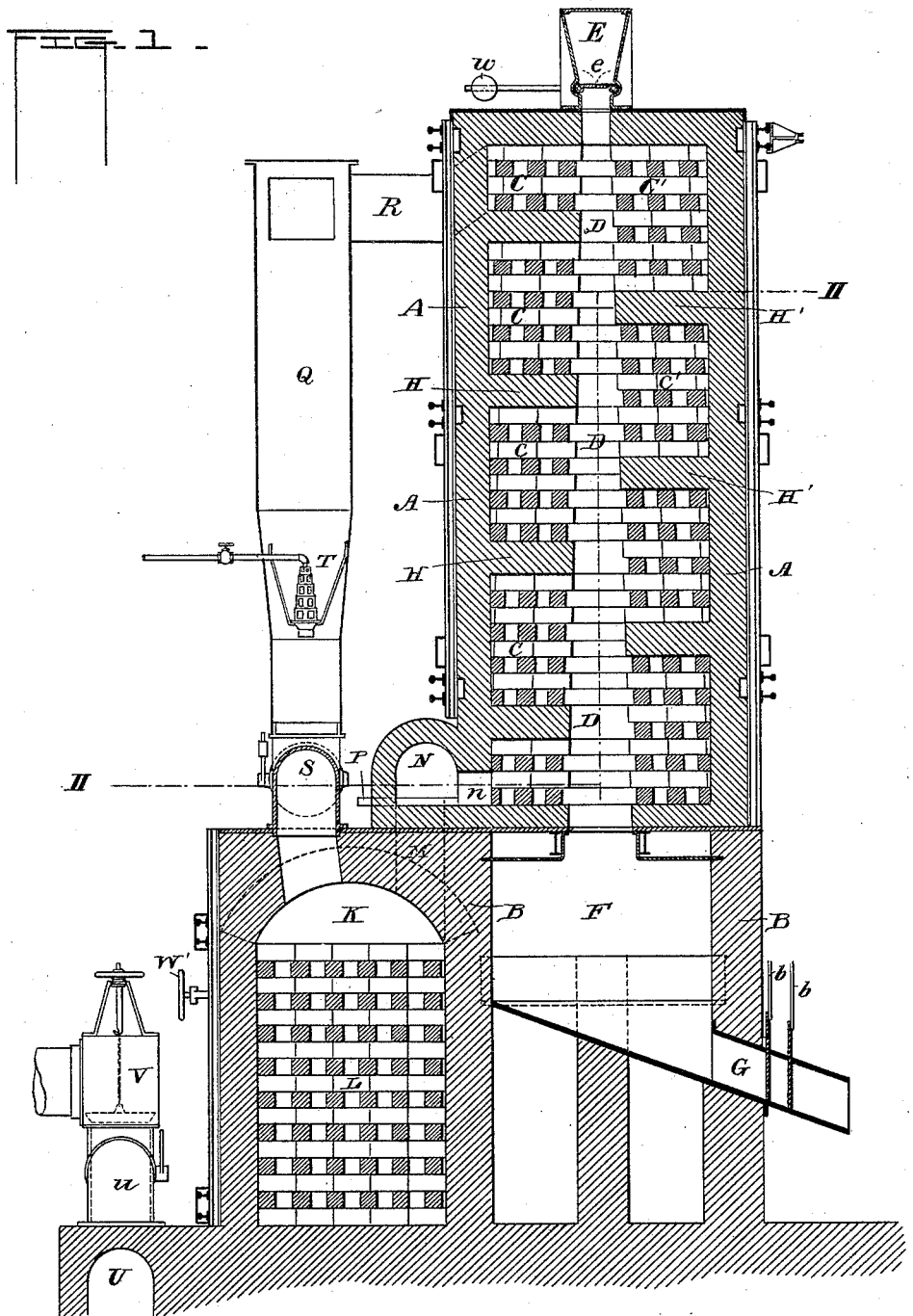
Figure 2:
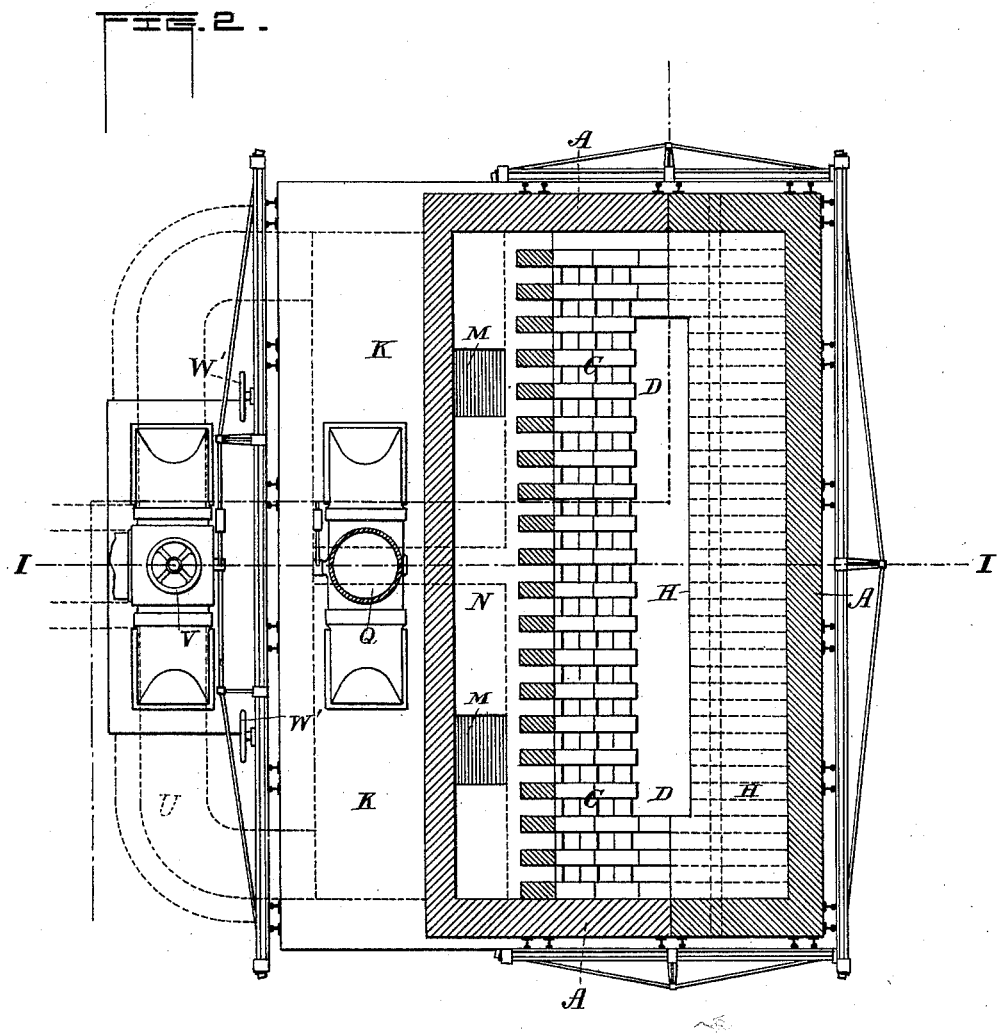
Figure 3:
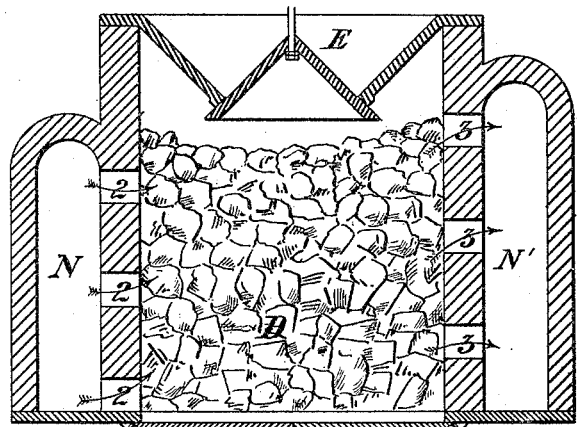
Figure 4:
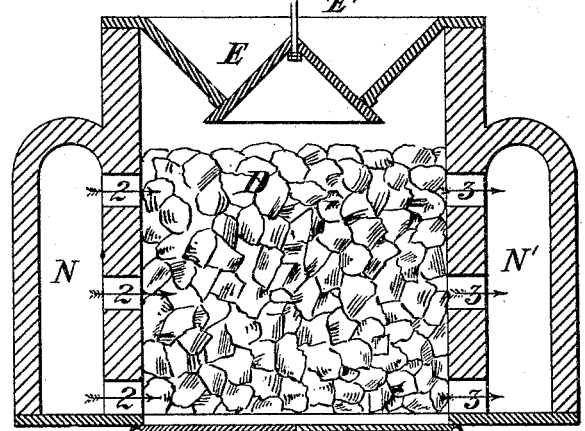
Figure 5:
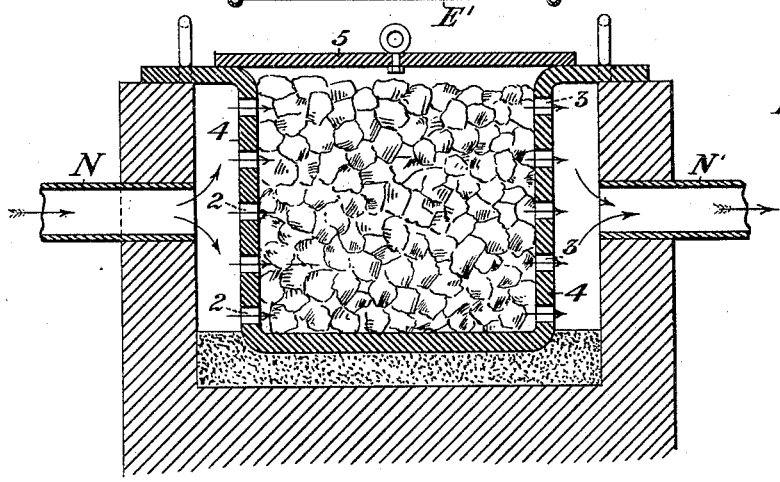

Figure 1 is a vertical sectional view of apparatus adapted to the practice of my invention. Fig. 2 is an irregular horizontal section on the line II II of Fig. 1. Figs. 3, 4, and 5 are vertical sectional views of several differently-constructed apparatus in which my invention may also be practiced.

Like symbols of reference indicate like parts in each figure.

My invention relates to an improvement in that process of reducing metallic ores in which the reduction of the ore is effected by passing through it a current of heated reducing-gas—such as carbonic oxide—which deoxidizes the ore and reduces it to a metallic condition.

The rationale of this process of deoxidizing metallic oxides is as follows: In acting on the oxides of iron the carbon present in the reducing-gas has at a red heat such affinity for the oxygen combined with the metal in the ore that the latter element will leave the iron to combine with the carbon of the reducing-gas, changing the carbonic oxide (CO) into carbonic acid ($CO_2$). If carbonaceous matter—such as coke—be intermingled with the ore, the second equivalent of oxygen in the carbonic acid will take up an equivalent of carbon, thus returning to the condition of carbonic oxide, and, thus revived, will become once more available as a reducing agent. If no carbonaceous matter be present in the mass of ore, the oxidizing effect of the carbonic acid upon the metallic iron already produced will eventually be remedied by the constant current of fresh gas and the oxygen be thoroughly eliminated from the ore.

In this process the chief requisite to its practice on a large scale and to its commercial success is that the reducing-gas shall thoroughly permeate the mass of ore under treatment, and shall pass therethrough in a current sufficient to present to the ore fresh gas to take the place of the gas continually undergoing the process of conversion into carbonic acid. The practical difficulties experienced in causing the gas to flow through the mass of ore in sufficient volume to cause rapidly and thoroughly the desired reaction have prevented hitherto the commercial success of the direct process of reduction above described, so that the expensive blast-furnace process has been almost universally used to convert the ore into pig-iron as a preliminary to its further treatment.

I have discovered that the difficulties of transmission of the gas through the ore may be overcome and the direct process made practicable for use on a large scale by giving to the gas a horizontal direction, as contrasted with the vertical direction heretofore sought to be given to it. For example, if two similarly-charged cubical reducing-chambers of like dimensions be so arranged that the gaseous current will traverse the material in a horizontal direction in one of them and in a vertical direction in the other, the force required to drive or draw the gas through the material in a horizontal direction will be much less than that required to drive or draw it through the material vertically. This discovery I utilize by so constructing the reducing apparatus as to cause the passage of the gas through the material to be either wholly in a horizontal direction or approximating thereto as nearly as considerations of convenience in the construction and operation of the apparatus will permit.

In the first claim I employ the expression "substantially horizontal" to mean a direction exactly horizontal or one somewhat inclined, and therefore approximately horizontal.

The discovery of the superior ease of movement of the gas through the material in a horizontal as compared with a vertical direction, and the more thorough and more rapid reduction of the ore thereby affected is of the greatest importance in iron metallurgy.

It renders easy of accomplishment that which has hitherto been striven for in vain—to wit, the thorough permeation by the reducing-gas of bodies of ore of sufficient magnitude to render the quantity of the output large enough to make the operation economically successful.

I am aware that reducing-gas has been heretofore caused to pass in a more or less horizontal direction through or over thin layers of ore and where passed through it the ore has usually been caused to move in a downward direction in body of small thickness over gas-passages, and also that reducing-gas has been introduced into one end or side of a small reducing vessel or retort having an opening at the other end or side only, so that the gas has been forced to pass more or less horizontally through the contents of the retort; but the problem which I have solved is materially different from either of these, being that of effecting the permeation of a large mass of ore with the hot reducing-gas in a kiln or reducing-chamber in which the reducing-gas is not necessarily compelled by the construction of the furnace to take either a horizontal or vertical course in traversing the ore. The horizontal as distinguished from the vertical passage of gas through the mass of ore has always been regarded as very difficult, and therefore undesirable; but I have discovered that it is in fact not only easy of accomplishment, but also the most effective method of securing the intimate commingling of the gas with the particles of ore.

My improvement then consists in the application to the kiln process of reduction as distinguished from the retort process of the horizontal or substantially horizontal passage of the gas through a mass of ore, either by one or more separate transverse passages or by a series of substantially horizontal passages at progressively-higher levels, as hereinafter described.

Many different forms of apparatus may be devised for the practice of my improved process. I have shown in the drawings several constructions of apparatus which I deem to be well suited for this purpose, and shall now proceed to describe the same, premising that my invention is not limited to the construction or form of the apparatus, but relates, broadly, to my newly-discovered and peculiar mode of passing the reducing-gas through the material under treatment.

The apparatus shown in Figs. 1 and 2 is described and claimed in a prior patent-application, Serial No. 322,813, filed September 3, 1889. The apparatus shown in these figures of the drawings consists, principally, of a reducing-furnace having a series of checker-work chambers arranged on opposite sides of a central reducing-space, in which the ore is treated, said chambers being separated from each other on opposite sides of the furnace by the reducing-space and on the same side by diaphragms.

In the drawings, A is the furnace, built of brick-work upon a foundation B, which, as shown in the drawings, is rectangular and oblong, but may be circular, elliptical, or other convenient shape. The interior of the furnace is furnished with checker-work C C', of fire-brick, arranged on each side and at the two ends of the furnace, as shown in Figs. 1 and 2, the checker-work being so arranged (as shown in those figures) as to leave a clear vertical space D from the top to the bottom of the furnace. In this space D the ore is charged and is reduced. The space D is long and narrow, as shown in Fig. 2, and tapers upward in width, being narrower at the top than at the bottom, so as to give the necessary clearance for the descent of the charge. This working-space D is closed at top by a covered hopper E, which has, besides its cover, at the bottom of the hopper a hinged trap-door $e$ for the admission of the charge, which is normally kept closed by a weight $w$. The working-space D is also closed at the bottom either by a removable door of ordinary construction or, preferably, as shown in the drawings, Fig. 1, by being placed over a tightly-closed reservoir F, which forms part of the foundation B. This reservoir F is the receptacle into which the reduced ore (iron sponge) is discharged from the working-space D of the furnace, and is provided with one or more inclined chutes G, from which the reduced ore is removed from time to time, double sliding doors $b\ b$ being provided to each chute, so that one may be closed when the other is opened, so as practically to exclude the air from contact with the hot sponge.

The checker-work C C', &c., in the interior of the furnace A is placed within a series of separate chambers formed by the horizontal shelves or diaphragms H H', &c., which extend from end to end of the furnace and from each side to the central working-space D; but the diaphragms H on one side of the space D are not on the same level as those H' on the opposite side, (see Fig. 1,) the diaphragm H on one side being placed in a horizontal plane about midway between two diaphragms H' on the opposite side.

Below the furnace A are placed two regenerators K K', fitted with brick checker-work L in the usual way. These regenerators are connected by uptakes M with a horizontal flue N, which extends the whole length of the furnace and connects by numerous adits $n$ with the checker-work $C^2$ in the lowest checker-work chamber of the furnace on one side, as shown in Fig. 1. Valves P P' (preferably made of fire-clay tile) are connected with the flue N, by which the regenerators K K' are alternately connected with the checker-work $C^2$ in the lowest chamber in the interior of the furnace. A short horizontal flue R connects the topmost of the checker-work chambers C of the furnace with a downtake or draft-flue Q, which conveys the gas as it leaves the furnace downward to one of the regenerators K K', through the butterflyvalve S, which can be set so as to admit the gas from the top of the furnace into either of the regenerators, the valves P, P', and S being reversed from time to time, so that when the regenerator K' is in connection with the furnace the other regenerator K is connected with the downtake-flue Q, and vice versa. A steam-ejector T, placed in the downtake Q, determines the direction of the draft downward from the top of the furnace A to the regenerators and regulates its amount and velocity. A flue U connects both of the regenerators K K' with a stack or chimney to carry off the products of combustion, and a valve $u$, according as it is set, connects one or other of the regenerators with the flue and chimney.

The reducing-gas by which the ore is to be reduced may be either carbonic oxide (CO) or hydrocarbon gas or vapor, prepared in a separate gas-producer of any desired construction. If carbonic oxide is used, the common Siemen's gas-producer may be employed. If hydrocarbon gas or vapor, it may be manufactured in any suitable apparatus, or may be simply a vessel charged with petroleum or other liquid hydrocarbon and heated sufficiently to vaporize it.

V is a valve for admitting the carbonic oxide or hydrocarbon gas or vapor from the producer to one or other of the regenerators K or K', according as the valve V is set.

The operation of the apparatus hereinbefore described as applied to the reduction of iron ores by a direct and continuous process is as follows: When the furnace is first used, or when first used after having been emptied of its charge of reduced ore, the lower portion of the reservoir L is filled with kindling materials, on top of which coke is charged to or nearly to the top of the working-space D, the kindling is ignited, and the doors $b\ b$ at the bottom of the reservoir, as well as the hoppers at the top of the working-space D, are opened wholly or partially, so as to secure the ignition and combustion of the coke. When the working-space is sufficiently heated, the air is shut off, and the ore to be reduced is then charged into the working-space D of the furnace through the hoppers E, which by using the trap-door $e$ will serve if desired, as a measure of quantity of the charge. The ore before being introduced may, if desired, have mixed with it a small quantity of some carbonaceous solid, such as coke, coal, charcoal, &c. I have found it advantageous to use for this purpose coke to the amount of ten to fifteen per centum, by weight, of the charge of ore. The working-space D is filled with this charge from top to bottom, and if a continuous process is desired the working-space is kept filled up with ore (or ore and carbon) as the reduced ore gradually passes away below.

Before commencing the operation of reduction the regenerators K K' are both heated to from 800° to 1,200° Fahrenheit. The supply-pipe of the ejector T is connected with the live-steam space of a steam-generator, the hopper E is closed, as also the sliding doors $b\ b$ in the chute of the reservoir F, so as to exclude as much as possible the external atmospheric air from the interior of the furnace A, and the valves S, P, and V are set so as to connect one regenerator, as K, with the flue N, and thus with the lower chamber $C^2$ of one side of the furnace A. The valve V is set so as to connect the same regenerator K with the gas-producer, and the valve S is set so as to connect the downtake Q from the top of the furnace with the other regenerator K'. The apparatus being thus adjusted, the carbonic oxide from the gas-producer enters the flue, and thence passes up through the previously-heated checker-work in the regenerator K and becomes thereby heated to a temperature of from 800° to 1,200° Fahrenheit, and thence arises through the uptake M into the flue N and enters the lowest checker-work $C^2$ at one side of the furnace, through the adit $n$, heating the checker-work in the furnace as it traverses it. As the gas finds no passage-way upward, being obstructed by the partition or diaphragm H, it passes horizontally through the mixed ore and carbonaceous matter at the lower end of the working-space D. Here its upward passage through the superincumbent charge of ore being difficult, the gas, following the path of least resistance, enters the lowest of the chambers C' on the opposite side of the furnace. Here it rises through the checker-work until it meets the obstruction of the first partition of that side of the furnace, which is at a higher level than the first partition on the other side, and is forced to pass again horizontally into the charge of ore, &c., in the working-chamber D, and again taking the path of least resistance it enters the checker-work on the side of the furnace at which it first entered, but into a chamber higher up, and thus, owing to the obstruction presented by the partitions H H, &c., on one side and H' H' on the other side, and to the position of the partitions on one side of the space D being on a different level from those on the opposite side, the reducing-gas is compelled to follow a zigzag course backward and forward horizontally through the column of ore in the working-space D and vertically and progressively through the chambers C C' until it reaches the horizontal flue R, through which it enters the downtake Q and passes down through the valve S, set to conduct it into the other regenerator K'. Here the gas meets and combines with a current of atmospheric air admitted in any desired and regulated quantity to secure complete combustion by means of the valve W' communicating its heat to the checker-work in the regenerator. The products of combustion thence pass off through one of the flues U and valve $u$ to the stack or chimney placed at any convenient point. The downward draft through the downtake Q and consequently the upward current through the furnace A are secured and regulated by the ejector T, situate in the downtake Q.

In order to preserve the required uniform temperature of gas passing through the furnace, the regenerator-valves should be shifted every ten or fifteen minutes, so as to turn the supply-gas from the producer into the regenerator, which has just been heated up by combustion of the escape-gas from the top of the furnace, and thence through the valve P and flue N into the bottom of the furnace and to change the course of the escape-gas from the top of the furnace through the downtake Q by the valve S into the regenerator, through which the supply-gas has just been passing. Any other means for heating the ingoing gas may be employed. For example, where the gas-generator is capable of supplying the gas at a sufficiently-elevated temperature such generator may be so placed as to deliver the gas directly into the flue N.

The iron sponge when produced drops down gradually into the receptacle or reservoir F, which, extending under the entire length of the furnace, will hold a large amount of sponge. The doors $b\ b$ being kept closed, the sponge is substantially protected from the access of atmospheric air, which would rapidly oxidize the sponge, especially when in a heated condition.

By means of the apparatus constructed as above described I am enabled to carry the current of reducing-gas horizontally back and forth through the column of material, performing the work of reduction in the most thorough manner and with great rapidity, owing to the considerable height of the column of material under treatment at one time.

In Fig. 4 I show another form of apparatus by which my invention may be practiced. The reducing-chamber D is unprovided with the lateral checker-work chambers and diaphragms, such as are shown in Fig. 1, but has lateral openings 2 3, which open into flues N and N', for the supply and discharge of the reducing-gases. The ore and coke are charged into the reducing-chamber through the hopper E, and are removed at the base thereof through a drop-bottom E'. The flues N and N' may be connected with regenerators, as explained with reference to Figs. 1 and 2, or the flue N may be connected directly with a gas-producer and the flue N' connected directly with the stack. The reducing-gas enters the chamber D through the holes 2, and after passing horizontally through the body of ore and coke, emerges through the holes 3 and passes off through the flue N'. By reason of this horizontal course of the gas but comparatively little resistance is afforded to its passage, and it may be introduced into the chamber in volume large enough to effect with rapidity the desired reduction. It will be observed, however, that as the gas passes through the body of ore but once, and does not assume a zigzag or recurrent course, as in the use of the apparatus shown in Figs. 1 and 2, it does not come so thoroughly into contact with the particles of ore. The apparatus is therefore not so economical as that of Figs. 1 and 2, and requires the use of a greater quantity of gas; but in respect of the horizontal course assumed by the gas in passing through the ore it affords means by which my invention may be practiced efficiently and with good results.

The apparatus shown in Fig. 3 is substantially the same as that shown in Fig. 4, except that the holes 2 and 3 are not precisely opposite to each other, but are alternately arranged, so that the gas passes through the ore not in exactly horizontal lines, but in lines which, though substantially horizontal, are somewhat inclined. By use of this apparatus the advantages of my invention are secured, although of course the greater the degree of deviation of the gas from a horizontal course the more difficult is its passage and the less are the advantages of the invention obtained.

In the apparatus shown in Fig. 5 the ore to be reduced is placed with its carbonaceous addition in a vessel 4, which is removably set within the chamber of the reducing-furnace upon a bed of sand and extends from end to end of the chamber. The reducing-gas enters the chamber through the flue N and traverses horizontally the vessel 4, entering through holes 2 on one side and escaping through holes 3 on the other side, finally passing from the chamber through the exit-flue N'. During the process of reduction air should be excluded from the vessel by means of a cover-plate 5, the edges of which may be luted with clay or sand. When the reducing process is complete, the vessel, with its charge of iron sponge, may be lifted from the furnace and conveyed to the refining-furnace—such as an open-hearth furnace—where its treatment is continued and completed, as will be readily understood.

I claim—

1. In the kiln process of reducing iron oxides by a heated gaseous reducing agent passed through the mass of ore under treatment, the improvement which consists in passing such heated reducing-gas through the mass in a direct substantially horizontal current, substantially as and for the purposes described.

2. In the kiln process of reducing iron oxides by a heated gaseous reducing agent, the improvement consisting in causing such heated reducing-gas to traverse back and forth through a columnar mass of ore in a progressive course, substantially as and for the purposes described.

In testimony whereof I have hereunto set my hand this 9th day of January, A. D. 1890.

CHARLES ADAMS.

Witnesses:
W. B. CORWIN,
THOMAS W. BAKEWELL.